(12) United States Patent
Michel et al.

(10) Patent No.: US 6,801,409 B2
(45) Date of Patent: Oct. 5, 2004

(54) READ HEAD SHIELD HAVING IMPROVED STABILITY

(75) Inventors: Richard P. Michel, Minneapolis, MN (US); Mark T. Kief, Savage, MN (US); Dehua Han, Eden Prairie, MN (US); Venkateswara R. Inturi, Shakopee, MN (US); Vladyslav A. Vas'ko, Minneapolis, MN (US)

(73) Assignee: Seagate Technology LLC, Scotts Valley, CA (US)

(*) Notice: Subject to any disclaimer, the term of this patent is extended or adjusted under 35 U.S.C. 154(b) by 315 days.

(21) Appl. No.: 09/952,725

(22) Filed: Sep. 14, 2001

(65) Prior Publication Data

US 2002/0034054 A1 Mar. 21, 2002

Related U.S. Application Data

(60) Provisional application No. 60/233,812, filed on Sep. 19, 2000.

(51) Int. Cl.[7] .................................................. G11B 5/39
(52) U.S. Cl. ...................................................... 360/319
(58) Field of Search .................................. 360/319, 128

(56) References Cited

U.S. PATENT DOCUMENTS

| | | | |
|---|---|---|---|
| 4,803,580 A | 2/1989 | Mowry | 360/113 |
| 4,843,506 A | 6/1989 | Gill et al. | 360/113 |
| 4,881,143 A | 11/1989 | Bhattacharyya et al. | 360/113 |
| 5,018,037 A | 5/1991 | Krounbi et al. | 360/113 |
| 5,032,945 A | 7/1991 | Argyle et al. | 360/126 |
| 5,168,409 A | 12/1992 | Koyama et al. | 360/113 |
| 5,208,715 A | 5/1993 | Mowry | 360/113 |
| 5,255,141 A | 10/1993 | Valstyn et al. | 360/126 |
| 5,264,980 A | 11/1993 | Mowry et al. | 360/113 |
| 5,495,378 A | 2/1996 | Bonyhard et al. | 360/113 |
| 5,515,221 A | 5/1996 | Gill et al. | 360/113 |
| 5,535,079 A | 7/1996 | Fukazawa et al. | 360/126 |
| 5,621,592 A | 4/1997 | Gill et al. | 360/113 |
| 5,621,595 A | 4/1997 | Cohen | 360/126 |
| 5,633,771 A | 5/1997 | Yoda et al. | 360/121 |
| 5,986,856 A | 11/1999 | Macken et al. | 360/113 |
| 6,018,443 A | 1/2000 | Watanabe et al. | 360/113 |
| 6,097,578 A | 8/2000 | Pokhil | 360/319 |
| 6,169,646 B1 | 1/2001 | Macken et al. | 360/319 |
| 6,222,702 B1 | 4/2001 | Macken et al. | 360/128 |
| 6,456,467 B1 * | 9/2002 | Mao et al. | 360/319 |

FOREIGN PATENT DOCUMENTS

| | | | |
|---|---|---|---|
| JP | 06-084144 | * | 3/1994 |
| JP | 09-274212 | * | 10/1997 |

* cited by examiner

*Primary Examiner*—George J. Letscher
(74) *Attorney, Agent, or Firm*—Westman, Champlin & Kelly

(57) ABSTRACT

A read head shield having improved stability includes a ferromagnetic (FM) layer and an anti-ferromagnetic (AFM) layer adjacent the FM layer. The FM layer has a patterned shape and a domain configuration that is defined by a plurality of local magnetic domains that are stabilized in accordance with the patterned shape. The AFM layer is annealed to imprint thereon the stabilized local magnetic domains of the FM layer. The AFM layer operates to increase the stability of the domain configuration of the FM layer thereby providing improved resistance to domain configuration shift caused by the application of a strong magnetic field.

12 Claims, 5 Drawing Sheets

READ HEAD SHIELD HAVING IMPROVED STABILITY

CROSS-REFERENCE TO RELATED APPLICATION

The present invention claims priority to U.S. Provisional Application No. 60/233,812, filed Sep. 19, 2000 and entitled "METHOD FOR STABILIZING THE MAGNETIC DOMAIN CONFIGURATION OF A PATTERNED FERROMAGNETIC SHIELD USING AFM LAYER AND ZERO FIELD ANNEAL."

BACKGROUND OF THE INVENTION

The present invention generally relates to a shield for use with a magnetoresistive (MR) read head that absorbs strayed magnetic fields that could affect the operation of a read element of the MR read head. More particularly, the present invention relates to a patterned shield of an MR read head having a magnetic domain configuration that is highly stable against exposure to large and non-uniform magnetic fields.

Disc drives are the primary devices employed for mass storage of computer programs and data used in computer systems. Disc drives typically use rigid discs, which are coated with a magnetizable medium for storage of digital information in a plurality of circular, concentric data tracks. An MR head is adapted to write information to and read information from the data tracks. The MR head is carried by a slider which is connected to an actuator mechanism. The actuator mechanism moves the slider from track-to-track across the surface of the disc under control of electronic circuitry. The actuator mechanism includes a suspension assembly that applies a load force to the slider that urges the slider toward the disc. As the disc rotates, air is dragged and compressed under bearing surfaces of the slider creating a hydrodynamic lifting force that counteracts the load force and causes the slider to lift and "fly" in close proximity to the disc surface. A gimbaled attachment between the slider and the suspension assembly allows the slider to pitch and roll to follow the topography of the disc.

Typical MR heads include both read and write head portions. The read head includes a read element that is adapted to read magnetic flux transitions recorded to the disc in circular tracks which represent bits of data. The magnetic flux from the disc surface causes a change in the electrical resistivity of the read element, which can be detected by passing a sense current through the read element and measuring a voltage across the read element. The voltage measurement can then be decoded to determine the recorded data. The write head includes an inductive write element for generating a magnetic field that aligns the magnetic moments that are recorded to the disc surface to represent bits of data.

In high density disc drives the bits are closely spaced linearly along each circular track. In order for the read head to play back the closely spaced bits, the read element must be shielded from magnetic flux emanating upstream and downstream from the bit being read and from adjacent tracks. This is generally accomplished by positioning the read element between top and bottom shields. During a read operation, the shields ensure that the read element reads only the information stored directly beneath it on a specific track of the magnetic disc by absorbing the stray magnetic fields emanating from the surroundings.

As mentioned above, the read element of the read head has a resistance that varies in response to magnetic flux emanating from the dics surface. To illustrate the behavior of the read element, a response curve of the read element is generated that compares the voltage across the read element to the magnetic flux received from the disc by the read element. This response curve has both linear and non-linear portions and is dependent on stray magnetic fields produced, for example, by the bottom shield. It is preferred that the read element operate along the linear portions. This is accomplished by magnetically biasing the read element to operate at a biasing point that is located along the linear portion of the response curve. The stray fields produced, for example, by the bottom shield are accounted for when the read element is initially biased.

The top and bottom shields typically each include a ferromagnetic (FM) layer having a domain configuration that is defined by a plurality of magnetic domains that are contained within domain walls. Each magnetic domain has a magnetization that is oriented in a direction that is different than the magnetization of all adjacent domains. When exposed to a magnetic field, either during manufacture or operation of the disc drive, the magnetization of the magnetic domains within that shield change, thereby potentially causing the magnetic domains to move, grow, or shrink. If the magnetic field is sufficiently large, the shield's exposure to it can cause a random change in the domain configuration of the shield by relocating the domain walls in response to the shift in the magnetic domains.

As storage densities on magnetic discs have increased, the read element has become smaller and more sensitive to shifts in the domain configuration of the shields. Thus, when the shield is subjected to a large applied field, such as by the write element during write operations, the domain configuration of the shields move and then return to a different random arrangement. Unfortunately, when the domain configurations of the shields move, the stray magnetic fields produced by the shields change, thus changing the bias point of the read element as well as the response of the read element to signals emanating from the magnetic disc. The result is undesirable noise during read operations.

Therefore, it is desirable that the domain configurations of the shields be extremely stable. This relates to the tendency of the domain configuration to return to the same domain configuration even after the application and removal of a strong magnetic field. Accordingly, a stable domain configuration would only temporarily shift in position when a magnetic field is applied, and then return to the same domain configuration once it is removed. Unfortunately, prior art shields are not sufficiently stable to resist this domain configuration shift caused by application of a strong magnetic field.

Two proposals for increasing domain configuration stability in a shield are disclosed in U.S. Pat. Nos. 5,515,221 and 5,621,592, which issued to Gill et al. on May 7, 1996 and Apr. 15, 1997, respectively. The patents disclose a multi-layer magnetic structure that can be used to form a shield in an MR read head. The multi-layer structure includes an anti-ferromagnetic layer and a ferromagnetic layer. The anti-ferromagnetic layer is annealed in a magnetic field that increases the uniaxial and uni-directional anisotropy of the ferromagnetic layer and provides exchange pinning of the ferromagnetic layer which motivates the domain configuration of the ferromagnetic layer to return to a stable state even after application of an external magnetic field. Unfortunately, when the multi-layered magnetic structure is processed (e.g., milled, lapped, etc.) the pinned domain configuration of the ferromagnetic layer may no longer be in an ideal stable state. In other words, the domain configuration of the ferromagnetic layer would shift in the event that the anti-ferromagnetic layer was removed even when in a zero magnetic field environment. Due to this instability, the application of an external magnetic field to the shield formed of the multi-layer magnetic structure of the Gill patents can result in an undesirable random shift to the domain configuration of the ferromagnetic layer. As a result, an MR head utilizing the shield material disclosed in the Gill patents can still encounter problems associated with shield instability.

The domain configuration instability problems described above will be exacerbated as the read elements of the MR read head are formed smaller and made more sensitive in order to meet the ever increasing demands for higher data areal density recordings. Accordingly, there is a continued need to improve domain configuration stability of shields used in MR heads.

SUMMARY OF THE INVENTION

Aspects of the present invention are directed toward a disc drive storage system and a read head for use in a disc drive storage system. More particularly, the present invention is directed toward a shield for use in the disc drive storage system and read head. Additionally, the present invention is directed toward a method of forming the shield. The shield includes a ferromagnetic layer having a patterned shape and a domain configuration. The domain configuration is defined by a plurality of local magnetic domains that are stabilized in accordance with the patterned shape. The shield also includes an anti-ferromagnetic layer adjacent the ferromagnetic layer. The anti-ferromagnetic layer is annealed to imprint thereon the stabilized local magnetic domains of the ferromagnetic layer. This configuration results in increased stability of the ferromagnetic layer due to exchange-coupling between the ferromagnetic and the anti-ferromagnetic layers.

In the method of the present invention, the adjoining ferromagnetic and anti-ferromagnetic layers are formed with the ferromagnetic layer having a domain configuration that is defined by a plurality of local magnetic domains. Next, at least the ferromagnetic layer is patterned into a patterned shape. The domain configuration of the ferromagnetic layer is then stabilized in accordance with the patterned shape. Finally, the anti-ferromagnetic layer is heated beyond a blocking temperature to imprint thereon the stabilized local magnetic domains of the ferromagnetic layer. This results in an increase to the stability of the stabilized domain configuration of the ferromagnetic layer, which increases the likelihood that the domain configuration of the ferromagnetic layer will return to the stabilized domain configuration even after application of a strong magnetic field.

DETAILED DESCRIPTION OF ILLUSTRATIVE EMBODIMENTS

Figure 1:
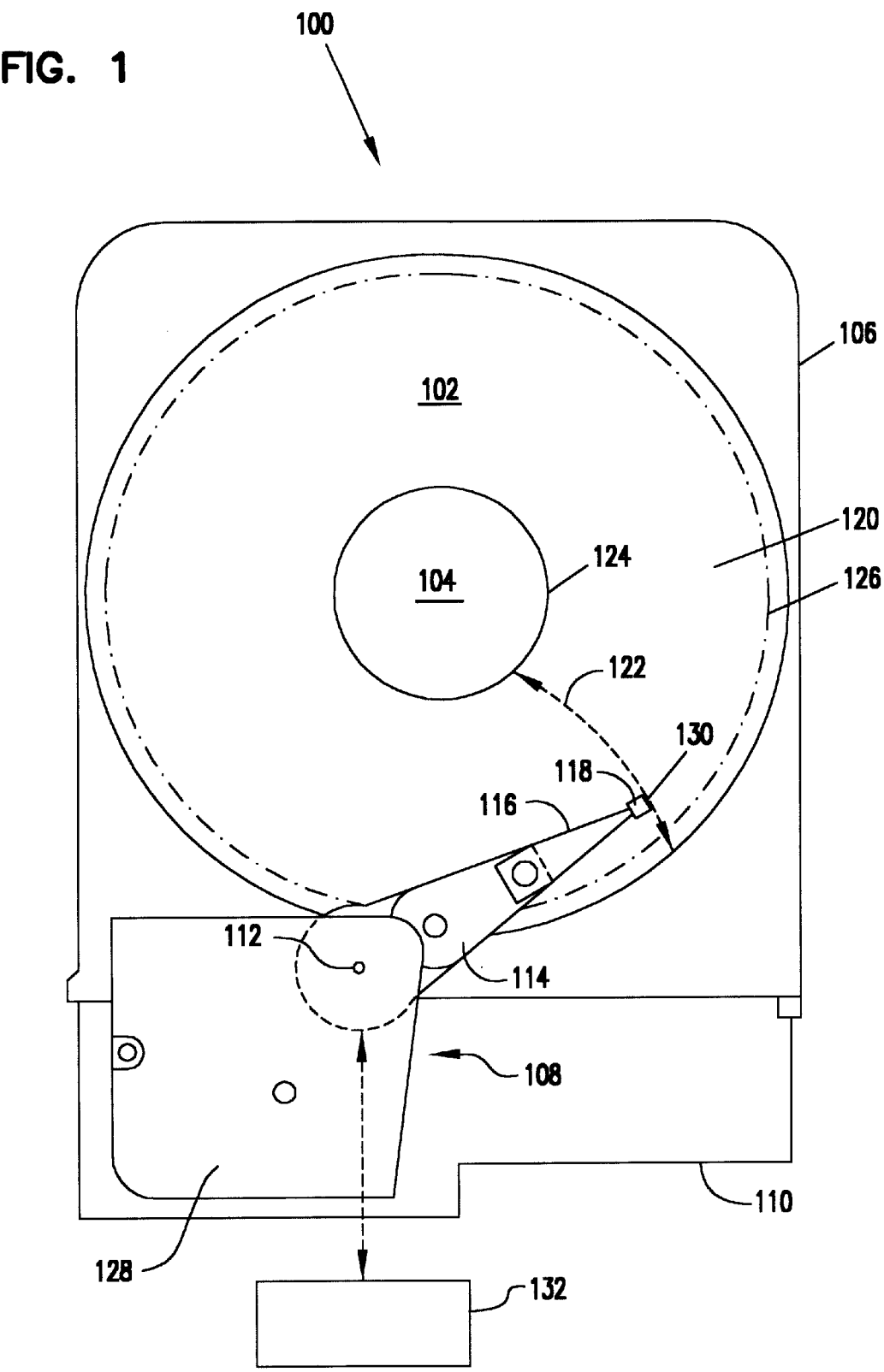
FIG. 1 is a simplified drawing of an example of a disc drive storage system with which embodiments of the present invention can be used.

FIG. 1 is a top view of a disc drive 100, with which embodiments of the present invention may be used. Disc drive 100 includes a magnetic disc 102 mounted for rotational movement about an axis 104 and driven by spindle motor (not shown). The components of disc drive 100 are contained within a housing that includes base 106 and a cover (not shown). Disc drive 100 also includes an actuator 108 mounted to a base plate 110 and pivotally moveable to disc 104 about axis 112. Actuator mechanism 108, includes actuator arm 114 and suspension assembly 116. Slider 118 is coupled to suspension assembly 116 through a gimbaled attachment which allows slider 118 to pitch and roll as it rides on an air bearing above surface 120 of disc 102. Actuator mechanism 108 is adapted to rotate slider 118 on arcuate path 122 between an inner diameter 124 and an outer diameter 126 of disc 102. A cover 128 can cover a portion of actuator mechanism 108. Slider 118 supports a read/write head 130 having separate read and write transducing elements for reading information from and writing information to disc 102.

During operation, as disc 102 rotates, air (and/or a lubricant) is dragged under air bearing surfaces (ABS) of slider 118 in a direction approximately parallel to the tangential velocity of disc 102. As the air passes beneath the bearing surfaces, air compression along the air flow path causes the air pressure between disc surface 120 and the bearing surfaces to increase, which creates a hydrodynamic lifting force that counteracts a load force provided by suspension 116 and causes slider 118 to "fly" above and in close proximity to disc surface 120. This allows slider 118 to support head 130 in close proximity to the disc surface 120.

Drive controller 132 controls actuator mechanism 108 through a suitable connection. Drive controller 132 can be mounted within disc drive 100 or located outside of disc drive 100. During operation, drive controller 132 receives position information indicating a portion of disc 102 to be accessed. Drive controller 132 receives the position information from an operator, from a host computer, or from another suitable controller. Based on the position information, drive controller 132 provides a position signal to actuator mechanism 108. The position signal causes actuator mechanism 108 to pivot about axis 112. This, in turn, causes slider 118 and the head 130 it is supporting to move radially over disc surface 120 along path 122. Once head 130 is appropriately positioned, drive controller 132 then executes a desired read or write operation.

Figure 2:
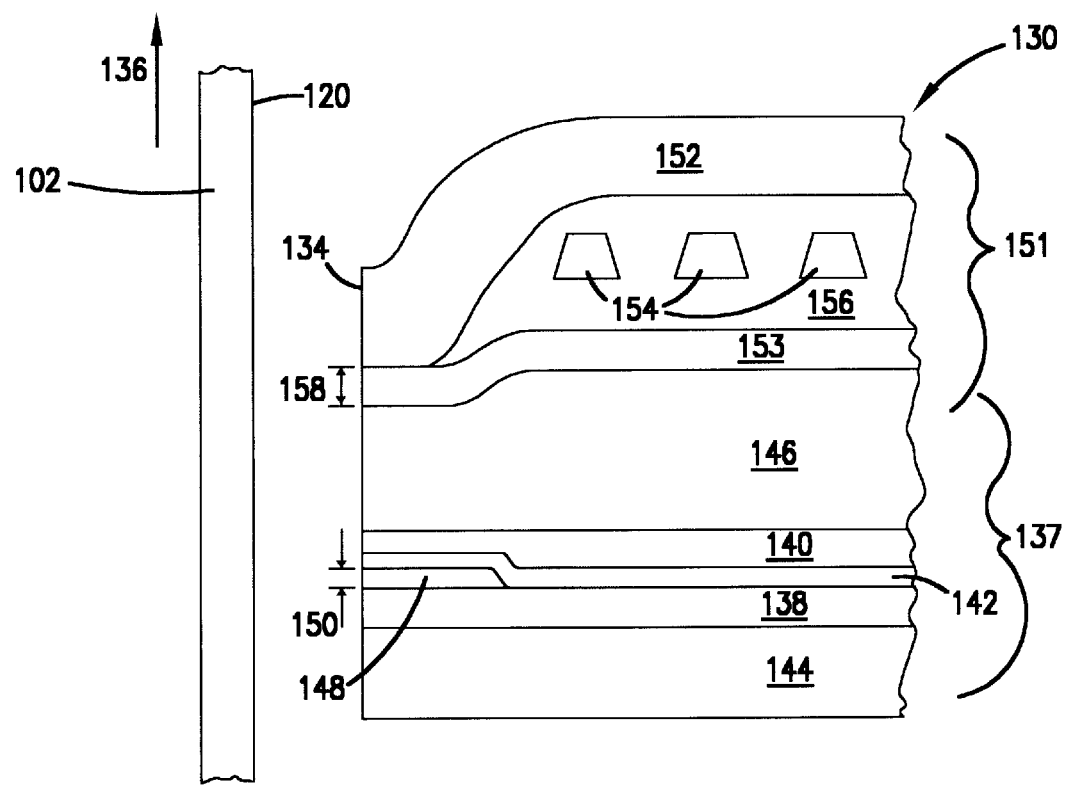
FIG. 2 is a cross-sectional view of a magnetic read/write head and a magnetic disc taken along a plane that is normal to an air bearing surface of the read/write head.

FIG. 2 is a cross-sectional view of an example of a head 130 and magnetic disc 102 taken along a plane normal to air bearing surface 134 of head 130. FIG. 2 illustrates magnetic head 130 and its placement relative to magnetic disc 102. Air bearing surface 134 of head 130 faces disc surface 120 of magnetic disc 102. Magnetic disc 102 travels or rotates in a direction relative to magnetic head 130 as indicated by arrow 136. The spacing between air bearing surface 134 and disc surface 120 is preferably minimized while avoiding contact between head 130 and magnetic disc 102. In most incidences, contact between head 130 and magnetic disc 102 would destroy both head 130 and magnetic disc 102.

A read head 137 portion of head 130 includes bottom gap layer 138, top gap layer 140, metal contact layer 142, bottom shield 144, top shield 146, and read element 148. Read gap 150 is defined on air bearing surface 134 between bottom gap layer 138 and metal contact layer 142. Metal contact layer 142 is positioned between bottom gap layer 138 and top gap layer 140. Read element 148 is positioned between bottom and top shields 144 and 146 at terminating ends of bottom gap layer 138 and metal contact layer 142. Top and bottom shields operate to isolate the read element from external magnetic fields that could affect its sensing of the magnetic moments immediately below it on the magnetic disc.

A write head 151 portion of head 130 includes top shield 146, top pole 152, write gap layer 153, conductive coil 154, and insulating material 156. Write gap 158 is defined on air bearing surface 134 by write gap layer 153 between terminating ends of top pole 152 and top shield 146. In addition to acting as a shield, top shield 146 also functions as a shared pole for use in conjunction with top pole 152. Electrically conductive coils 154 are provided to generate magnetic fields across write gap 158 and are positioned in insulating material 156 between top pole 152 and write gap layer 153. Although FIG. 2 shows a single layer of conductive coils 154, it is understood in the art that several layers of conductive coils, separated by several insulating layers, may be used. Furthermore, it should be understood that head 130 is one example of a head with which the various embodiments of the present invention may be used.

Figure 3:
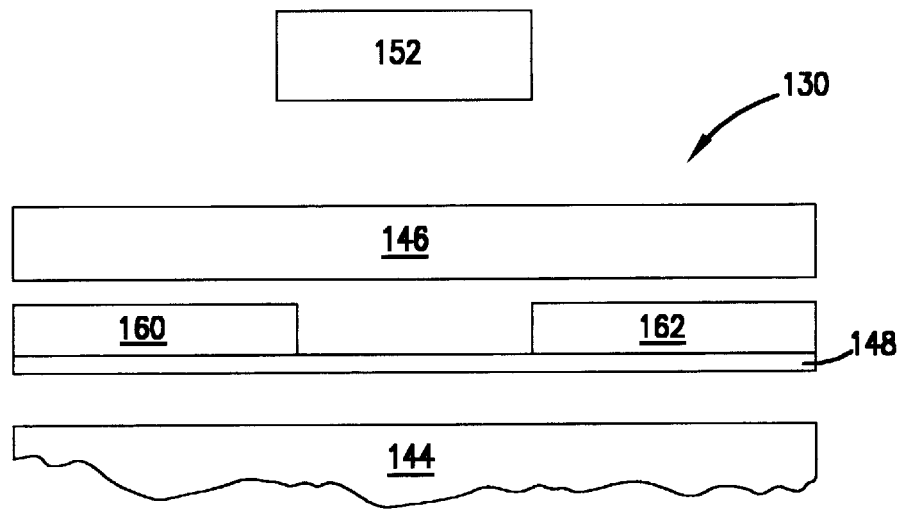
FIG. 3 is an expanded view of a giant magnetoresistive stack.

FIG. 3 is a layered diagram of head 130 and illustrates the location of a plurality of magnetically significant elements as they appear along air bearing surface 134 of head 130 shown in FIG. 2. In FIG. 3, all spacing and insulating layers are omitted for clarity. Bottom shield 144 and top shield 146 are spaced to provide room for a read element 148 therebetween. Read element 148 has two passive regions defined as the portions of read element 148 positioned adjacent to metal contacts 160 and 162. An active region of read element 148 is defined as the portion of read element 148 located between the two passive regions of read element 148. The active region of read element 148 defines a read sensor width.

Read element 148 is preferably a magnetoresistive element or a giant magnetoresistive stack, but other types of read elements can also be used as read element 148. A magnetoresistive element is generally formed of a ferromagnetic material whose resistance fluctuates in response to an external magnetic field, preferably from a magnetic medium or disc. By providing a sense current through the magnetoresistive element, a change in resistance of the magnetoresistive element can be measured and used by external circuitry to decipher the information stored on the magnetic medium or disc. A giant magnetoresistive stack operates similarly, but allows for a more pronounced magnetoresistive effect. A giant magnetoresistive stack is generally formed of three layers: a ferromagnetic free layer, a ferromagnetic pinned layer, and a non-magnetic spacer layer positioned between the free layer and the pinned layer. A pinned magnetization of the pinned layer is held constant while a free magnetization of the free layer is free to rotate in response to an external magnetic field, i.e. a transition from a magnetic disc. A resistivity of the giant magnetoresistive stack varies as a function of an angle between the direction of the free magnetization and the pinned magnetization.

Figure 4:
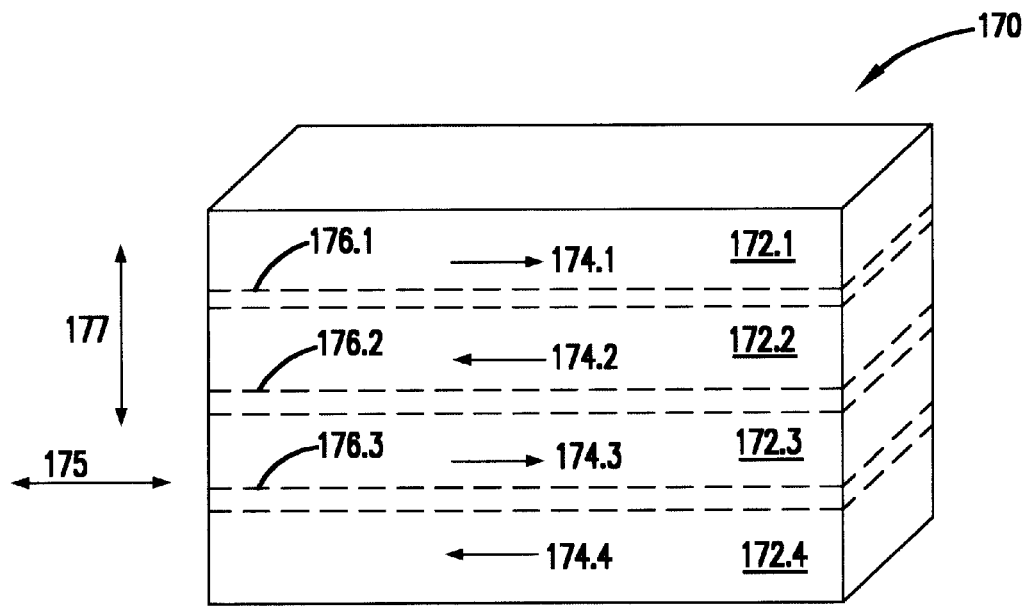
FIG. 4 is a cross-sectional view of a shield operating in a zero magnetic field environment.
Figure 5:
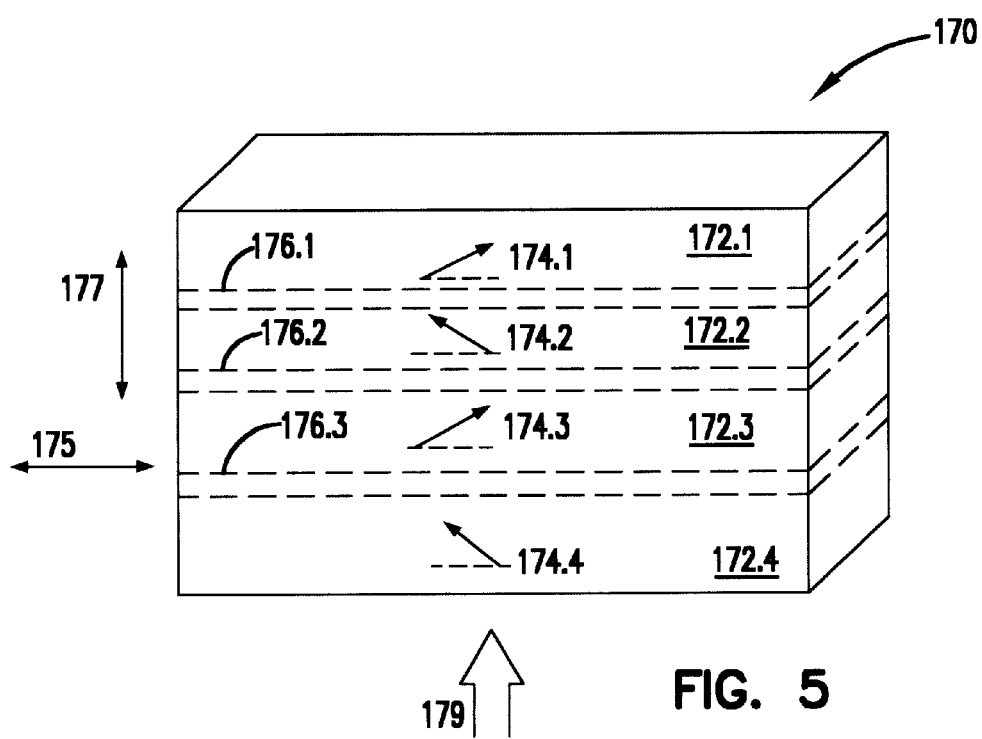
FIG. 5 is a cross-sectional view of a shield operating under an external magnetic field.

The shield of the present invention as well as those of the prior art typically include a ferromagnetic (FM) layer. FIGS. 4 and 5 are perspective views of an FM layer 170 respectively illustrating magnetic properties of the FM layer 170 with and without an external magnetic field being exerted upon it. FM layer 170 includes a plurality of local magnetic domains 172.1, 172.2, 172.3 and 172.4, hereinafter referred to as magnetic domains 172. Magnetic domains 172 define a domain configuration of the FM layer 170. Each of the plurality of magnetic domains 172 has a magnetization 174.1, 174.2, 174.3 and 174.4, hereinafter referred to as magnetizations 174, directed in a direction that is different than the magnetization of its adjacent magnetic domain 172. Separating the adjacent magnetic domains 172 are a plurality of domain walls 176.1, 176.2 and 176.3, hereinafter referred to as domain walls 176. Magnetization 174 is typically preferred to be directed toward read element 148. Magnetization 174 is typically set by exposing FM layer 170 to a large magnetic field that aligns the magnetization 178 as desired.

With no external magnetic field being applied to FM layer 170, each of the magnetic domains 172 can be made equally sized and the magnetization 174 of each of the plurality of magnetic domains 172 can be directed substantially parallel to the domain walls 176 along an easy axis direction, which is indicated by arrow 175, which is substantially perpendicular to a hard axis direction which is indicated by arrow 177. However, when an external field 179 is applied, magnetization 174 of each of the plurality of magnetic domains 172 rotate toward the direction of external field 179, as shown in FIG. 5.

It has been found that external magnetic fields applied to a magnetic shield (top or bottom), of a read head during manufacture and use, tend to randomize the magnetic domain configuration of the magnetic shield when removed resulting in a domain configuration shift. For example, when strong magnetic fields aligned with the easy axis direction 175 of the shield are applied to the magnetic shield, the magnetic shield can saturate in the easy axis direction 175. When the external field is reduced to zero, the domain configuration shifts to a random, unpredictable and undesired domain configuration, which interferes with operation of the read element. Furthermore, when these strong magnetic fields are applied to the shield at elevated temperatures, the domain configuration of the shield is even more susceptible to shifting. These magnetic fields and high temperatures can be encountered by the shield during manufacture and assembly of the disc drive and during the use of the disc drive.

Figure 6:
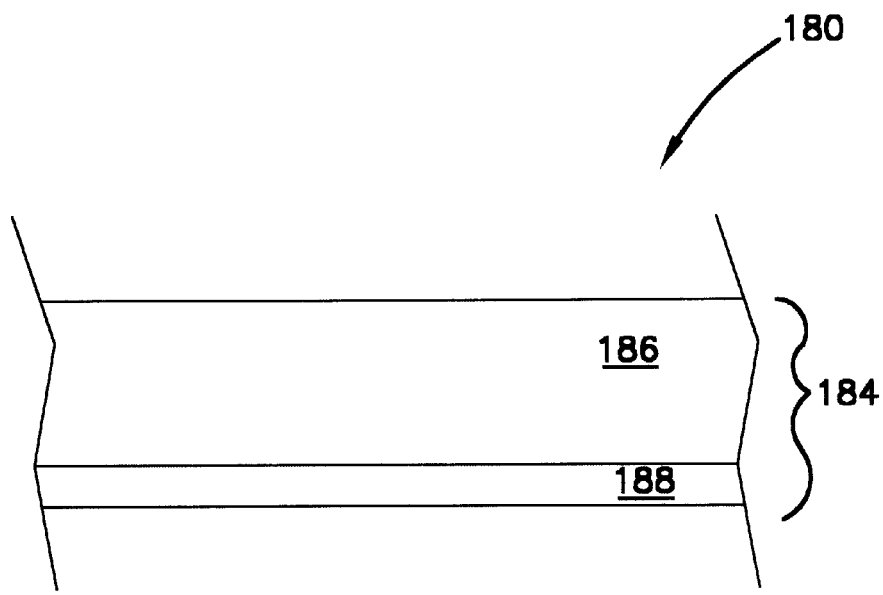
FIGS. 6 and 7 are cross-sectional views of magnetic shields in accordance with embodiments of the invention.
Figure 7:
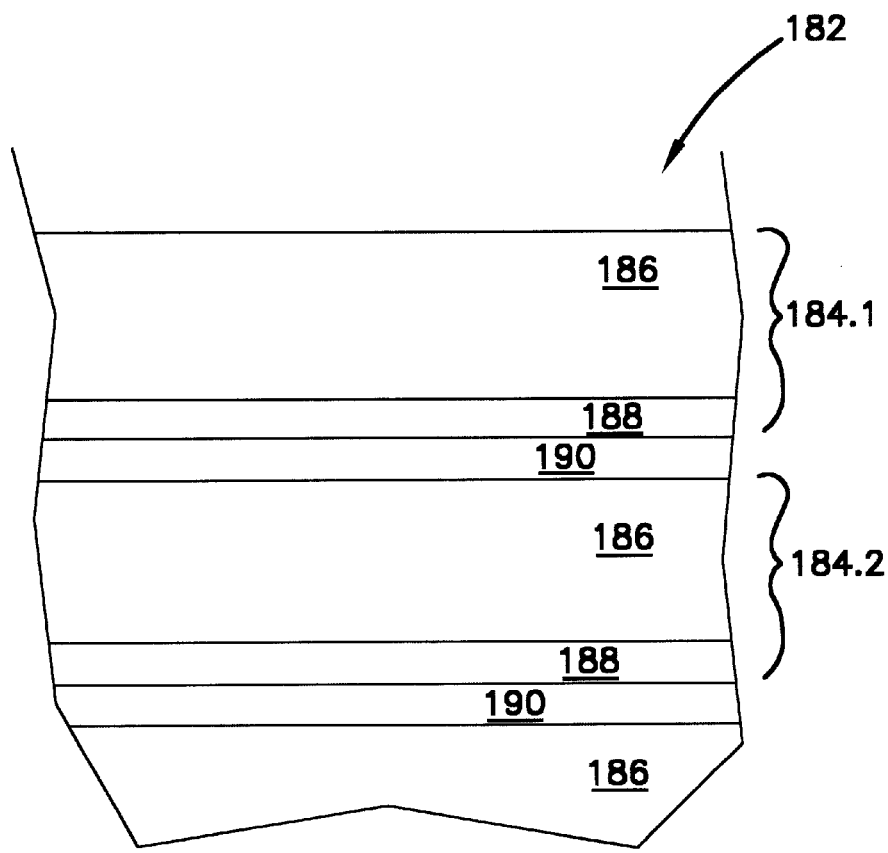

FIGS. 6 and 7 show cross-sectional views of patterned shields 180 and 182 in accordance with embodiments of the present invention, which can be used to form bottom shield 144 and/or top shield 146 of read head portion 137, shown in FIG. 2, or a shield for write head portion 151. The shields 180 and 182 are designed to ensure that the domain configuration of the shield returns to a stable state even after being subjected to a strong magnetic field. In the embodiment depicted in FIG. 6 shield 180 includes a shield layer 184 formed of an FM layer 186 and an AFM layer 188. Shield 182, depicted in FIG. 7, includes multiple shield layers 184.1 and 184.2, each of which are separated by a non-magnetic spacer layer 190. Although only two shield layers 184 are completely shown in FIG. 7, additional shield layers separated by a spacer layer 190 may be added as desired. Non-magnetic layer 190 can be formed of copper (Cu), tantalum (Ta), an aluminum oxide ($Al_xO_y$), or other suitable non-magnetic material. Non-magnetic spacer layers 190 allow for antiparallel alignment of the remanent magnetization structure that the AFM field can be used to enforce. For each of the shields 180 and 182, it is generally preferable to have the FM layer 186 closest to the component being shielded (e.g., the read element).

AFM layer 188 operates to stabilize a domain configuration, such as that shown in FIG. 4, of FM layer 186 through an exchange-coupling with FM layer 186, which softly "pins" the magnetization 174 of the local magnetic domains 172 of FM layer 186. Iron (Fe) alloys such as nickel-iron (NiFe), a material comprising iron, silicon and aluminum (FeSiAl), or an iron-nitride material (FeN), for example, or other suitable soft magnetic material can be used to form FM layer 186. Nickel manganese (NiMn), iron-manganese (FeMn), nickel-oxide (NiO) or other suitable AFM material may be used for AFM layer 188. The magnitude of the exchange-coupled field is a function of processing variables including the AFM material, the thickness of the AFM layer 188, the FM material and the thickness of FM layer 186. Thus, the exchange-coupling can be controlled to provide desired operating characteristics. For example, since the magnetization for FeN is approximately double that for NiFe, an exchange-coupling field of the same magnitude may be obtained with NiMn and FeN as that obtained with NiMn and NiFe-having a NiFe layer twice as thick as the FeN layer thickness.

The domain configuration of FM layer 186, defined by a plurality of local magnetic domains 172 (FIG. 4), has a natural tendency to shift to a stable configuration such that the magnetic energy is minimized. The domain configuration depends on the size, shape, thickness, stress, the properties of the FM material properties such as magnetostriction, saturation magnetization, magnetic anisotropy as well as the temperature and the magnetic history of FM layer 186. The shape of FM layer 186 is determined during the manufacture of the read head (or the read/write head), when the FM and AFM layers of shield 180 or 182 are patterned. The patterning of shield 180 generally includes at least a lapping process, during which the size of FM and AFM layers 186 and 188 is reduced to form the air bearing surface 134 (FIG. 2) of the read head 137. Other conventional processing steps that shield 180 or 182 can undergo during the manufacture of the read head 137 include milling and etching. Additionally, the domain configuration of the FM layer depends on its magnetic history. That is, the present domain configuration of FM layer 186 depends on its previous exposure to magnetic fields including those encountered during the manufacture of the read head 137. As a result, the domain configuration of FM layer 186 will periodically shift in response to changes in its shape and exposure to magnetic fields.

One aspect of the present invention is directed toward the control of the domain configuration of FM layer 186 of shields 180 and 182 to ensure that it is in a very stable condition prior to pinning that configuration by annealing the adjoining AFM layer 188 in a substantially zero magnetic field environment. When AFM layer 188 is annealed, the local magnetic domains 172 of FM layer 186 become imprinted upon AFM layer 188. By allowing the domain configuration of FM layer 186 to reach a highly stable state prior to pinning it, the resulting shield 180 or 182 becomes less prone to domain configuration shifting when exposed to a strong magnetic field than the shields of the prior art. Consequently, the shields 180 and 182 of the present invention are less likely to adversely affect the operation of the read element even after exposure to strong magnetic fields.

Figure 8:
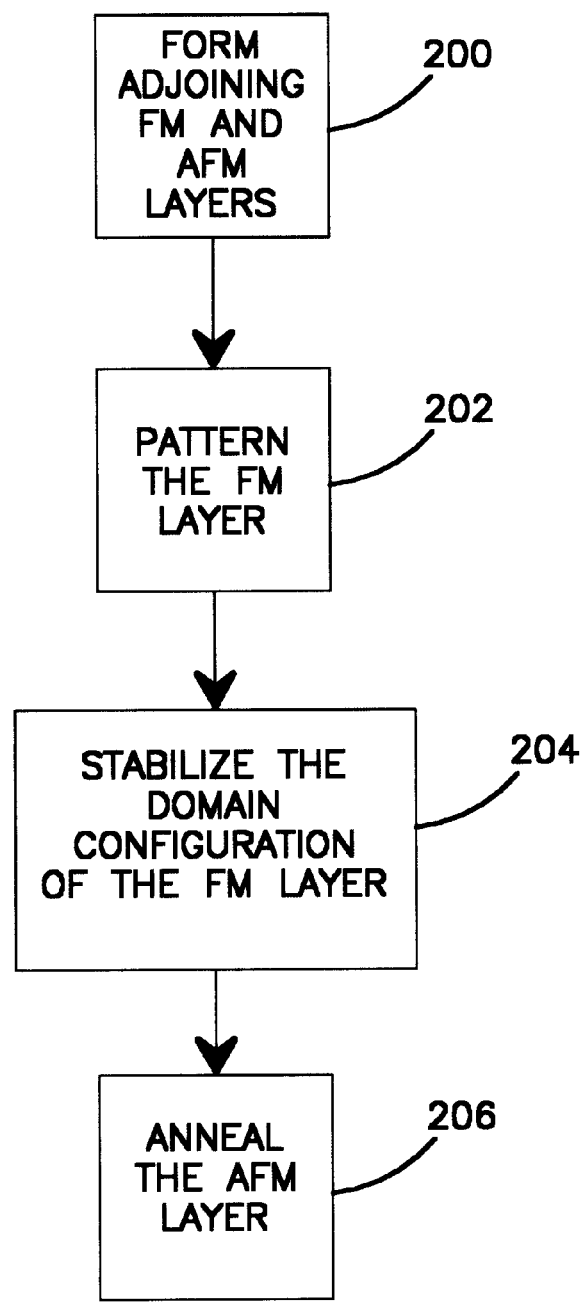
FIG. 8 is a flowchart illustrating a method of forming a magnetic shield in accordance with the invention.

FIG. 8 is a flowchart illustrating a method of the present invention of forming the above-described magnetic shield 180 for a read element 148 of a read head 137. At step 200, shield layer 184 (FIG. 6) is formed by adjoining FM and AFM layers 186 and 188, respectively. This step can be performed by depositing one of the layers or the other in accordance with conventional methods including physical vapor deposition, electroplating, for example. As mentioned above, FM layer 186 has a domain configuration that is defined by a plurality of local magnetic domains 172 (FIG. 4). At step 202, at least FM layer 186 is patterned into a patterned shape. For example, FM layer 186 can be lapped to form air bearing surface 134 shown in FIG. 2.

Next, at step 204, the domain configuration of FM layer 186 is stabilized. This generally involves demagnetizing FM layer 186, which results in FM layer 186 having a substantially zero net magnetization and a highly stable domain configuration. Many conventional demagnetization process can be used to accomplish this. One such demagnetization or stabilization process involves exposing FM layer 186 to sinusoidal magnetic field having a decaying amplitude. In other words, the direction of the applied magnetic field oscillates between positive and negative and the amplitude decreases over time. The demagnetization process may involve applied magnetic fields oriented with either the easy axis 175 or the hard axis 177 of FM layer 186.

At step 206, AFM layer 188 is annealed by heating it beyond a blocking temperature, such that the stabilized domain configuration or the plurality of local magnetic domains 172 (FIG. 4) of FM layer 186 become imprinted upon AFM layer 188. The blocking temperature of AFM layer 188 depends upon the material used to form AFM layer 188, as is understood by those skilled in the art.

One method of forming shield 182 of the present invention involves first forming a shield layer 184 in accordance with step 200 of the method of forming shield 180, shown in FIG. 8. Next, spacer layer 190 is formed on FM layer 186 of, for example, shield layer 184.2, shown in FIG. 7. These steps are repeated as desired to build shield 182 having multiple shield layers 184. Once all of the shield layers 184 have been formed, steps 202, 204 and 206 of the method illustrated in FIG. 8 are performed to complete the formation of shield 182.

In accordance with one embodiment of the invention, read head 137 is formed by forming a read element 148 between at least one shield 180 or 182 that is formed in accordance with the above-described methods. Such a read head 137 is less likely to encounter problems associated with domain configuration shift due to the stability of the shields.

In summary, the present invention is directed to a shield (180) for use in a disc drive storage system (100) that includes a ferromagnetic (FM) layer (186) having a patterned shape and a domain configuration, defined by a plurality of local magnetic domains (172) that are stabilized in accordance with the patterned shape. The shield also includes an anti-ferromagnetic (AFM) layer 188 adjacent the FM layer and annealed to imprint thereon the stabilized local magnetic domains of the FM layer. This configuration results in increased stability of the domain configuration of the FM layer, which provides increased resistance to domain configuration shift in response to application of a strong magnetic field.

Another embodiment of the invention is directed to a read head (137) for use in a disc drive storage system (100) that includes either a top shield (146) or a bottom shield (144) that is formed in accordance with the shields (180 or 182) of the present invention. Further, the read head includes a read element (148) that is formed between the top and bottom shields and adjacent an air bearing surface (134). Yet another embodiment of the invention is directed to a disc drive storage system (100) that includes the above described read head.

In one embodiment of the invention, the FM layer (186) is formed of a nickel-iron (NiFe) material, and iron-silicon-aluminum material (FeSiAl), or an iron-nitride (FeN) material. Also, the AFM layer (188) can be formed of nickel-manganese (NiMn), iron-manganese (FeMn), or nickel-oxide (NiO), in accordance with another embodiment of the invention.

Yet another embodiment of the invention is directed to a shield (182) that includes a first shield layer (184.1) that is formed of the FM layer (186) and the AFM layer (188) and includes at least a second shield layer (184.2) that is separated from the first shield layer by a spacer layer (190). In one embodiment, the spacer layer (190) is formed of a non-magnetic material. Also, the first and second shield layers are formed of adjoining FM and AFM layers (186 and 188). The FM layers include a patterned shape and a domain configuration defined by a plurality of local magnetic domains (172) that are stabilized in accordance with the patterned shape. The AFM layers are annealed to imprint thereon the stabilized local magnetic domains of the FM layers to thereby increase the stability of the domain configuration of the FM layers.

Another embodiment of the invention is directed to a method of forming a magnetic shield (180) for a read element (148) of a read head (137). In the method, adjoining FM and AFM layers (186 and 188) are formed (step 200). The FM layer has a domain configuration that is defined by a plurality of local magnetic domains (172). Next, at least the FM layer is patterned into a patterned shape (202) and the domain configuration of the FM layer is stabilized in accordance with the patterned shape (step 204). Finally, the AFM layer is heated beyond a blocking temperature to imprint thereon the stabilized local magnetic domains of the FM layer (step 206). This results in the shield having an FM layer whose domain configuration is highly stable and, therefore, resistant to domain configuration shift in response to an application of a strong magnetic field. In one embodiment of the method, the FM layer is patterned using an etching, milling, or lapping processing technique. In another embodiment, the domain configuration of the FM layer is stabilized by a demagnetizing process. This demagnetizing process involves applying oscillating magnetic fields to the FM layer that are oriented either along an easy axis (175) or a hard axis (177) of the FM layer. In yet another embodiment, the AFM layer is annealed in a substantially zero magnetic field environment. Alternatively, the AFM layer can be annealed in a magnetic field to increase unidirectional anisotropy of the domain configuration of the FM layer, in accordance with another embodiment of the invention. Another embodiment of the invention is directed to a method of forming a read head (137) that includes forming a top or a bottom shield (180 or 182) in accordance with the above-described method and forming a read element between the top and bottom shields.

Yet another embodiment of the invention is directed to a read head (137) that includes a read element (148) that is formed between patterned top and bottom shields (144 or 146). At least one of the shields includes an FM layer (186) having a stabilized domain configuration. Additionally, at least one of the top and bottom shields includes a stabilizing means (188) for preventing significant shifts to the stabilized domain configuration after exposure to a strong magnetic field.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the shield while maintaining substantially the same functionality without departing from the scope and spirit of the present invention. Additionally, the shields of the present invention can be applied to other components requiring magnetic shielding such as sensors and write head portions of disc drives.

What is claimed is:

1. A magnetic shield comprising:
   a ferromagnetic (FM) layer having a shape and a domain configuration that is defined by a plurality of local magnetic domains that are stabilized dependent on the shape of the FM layer; and
   an antiferromagnetic (AFM) layer adjacent the FM layer and annealed to imprint thereon the stabilized local magnetic domains of the FM layer, whereby stability of the domain configuration of the FM layer is increased.

2. A read head comprising:
   a top and bottom shield, wherein at least one of the top shield and bottom shields is formed in accordance with the shield of claim 1; and
   a read element formed between the top and bottom shields adjacent an air-bearing surface.

3. A disc drive storage system including the read head of claim 2.

4. The shield of claim 1, wherein the FM layer is formed of at least one material selected from a group consisting of NiFe, FeSiAl, FeN, CoFe, CoNiFe, and CoZrNb.

5. The shield of claim 1, wherein the AFM layer is formed of at least one material selected from a group consisting of NiMn, FeMn, PtMn, IrMn, PtPdMn, and NiO.

6. The shield of claim 1, wherein:
   the FM and the AFM layers form a first shield layer; and
   the shield includes at least a second shield layer formed of adjoining second FM and AFM layers and a spacer layer between the first and second shield layers.

7. The shield of claim 6, wherein the spacer layer is formed of a non-magnetic material.

8. The shield of claim 6, wherein:
   the second FM layer includes a patterned shape and a domain configuration, defined by a plurality of local magnetic domains that are stabilized in accordance with the patterned shape; and
   the second AFM layer is annealed to imprint thereon the stabilized local magnetic domains of the second FM layer, whereby stability of the domain configuration of the second FM layer is increased.

9. A read head comprising:
   a read element formed between top and bottom shields, at least one of which includes a ferromagnetic (FM) layer having a non-unidirectional stabilized domain configuration; and
   wherein at least one of the top and bottom shields includes a stabilizing means for preventing significant shifts to the stabilized domain configuration after exposure to a strong magnetic field.

10. The read head of claim 9, wherein:
    the stabilized domain configuration of the FM layer is defined by a plurality of local magnetic domains; and
    the stabilizing means includes an antiferromagnetic (AFM) layer adjacent the ferromagnetic layer and annealed to have local unidirectional anisotropies in accordance with the local magnetic domains of the stabilized ferromagnetic layer.

11. The read head of claim 10, wherein the AFM layer is formed of at least one material selected from a group consisting of NiMn, FeMn, PtMn, IrMn, PtPdMn, and NiO.

12. The read head of claim 9, wherein the FM layer is formed of at least one material selected from a group consisting of NiFe, FeSiAl, FeN, CoFe, CoNiFe, and CoZrNb.

* * * * *